United States Patent [19]

Reudink et al.

[11] 4,188,578
[45] Feb. 12, 1980

[54] SATELLITE COMMUNICATION SYSTEM WHICH CONCURRENTLY TRANSMITS A SCANNING SPOT BEAM AND A PLURALITY OF FIXED SPOT BEAMS

[75] Inventors: Douglas O. Reudink, Sea Girt; Yu S. Yeh, Freehold Township, Monmouth County, both of N.J.

[73] Assignee: Bell Telephone Laboratories, Incorporated, Murray Hill, N.J.

[21] Appl. No.: 907,796

[22] Filed: May 19, 1978

[51] Int. Cl.² .............................................. H04B 7/00
[52] U.S. Cl. ................................ 325/4; 343/100 ST; 343/100 CS
[58] Field of Search ........................ 325/3, 4, 5, 1, 14; 343/100 ST, 100 CS, 100 SA, 854

[56] References Cited

U.S. PATENT DOCUMENTS

| | | | |
|---|---|---|---|
| 3,406,401 | 10/1968 | Tillotson | 343/100 |
| 3,750,175 | 7/1973 | Lockerd et al. | 343/100 |
| 3,928,804 | 12/1975 | Schmidt et al. | 325/4 |

OTHER PUBLICATIONS

"Intelstat V Standard 'C' Earth Station Performance Objectives Applied To a Possible Eastern United States Location", Eascon-77, Rec. of IEEE, pp. 13-1A to 13-1I, M. P. Brown Electronics and Aerospace System Convention, Sep. 77.
"A Scanning Spot Beam Satellite System, BSTJ, vol. 56, No. 8, pp. 1549-1560".
"Characteristics and Applications of Multibeam Spacecraft Antennas", *Progress in Astronautics & Aeronautics*, vol. 33, pp. 503-531, Apr. 1972, W. G. Schmidt, et al.
"A Satellite-Switched SDMA/TDMA System for a Wideband Multibeam Satellite", *International Conference on Communications*, vol. 1, pp. 12-7, 12-12, W. G. Schmidt, Jun. 1973.
"Satellite-Switched TDMA: Transponder Switched or Beam Switched", Prog. in Astronautics & Aeronautics, vol. 41, pp. 139-154, W. G. Schmidt, Apr. 1974, pp. 37.5-32 to 37.5-35.
"Spectral Reuse in 12 GHz Satellite Communications Systems", Conf. Rec. I.C.C. 77, vol. 3, Jun. 1977.

*Primary Examiner*—Robert L. Griffin
*Assistant Examiner*—Michael A. Masinick
*Attorney, Agent, or Firm*—Erwin W. Pfeifle

[57] ABSTRACT

The present invention relates to a satellite communication system which uses a separate up-link and down-link fixed spot beam for communication with each of a plurality of, for example, spaced-apart high traffic demand ground areas and an up-link and a down-link scanning spot beam for communication with a plurality of, for example, spaced-apart low traffic demand ground areas on a time division multiple access (TDMA) basis. More particularly, a satellite repeater is disclosed for accomplishing the switching of signals concurrently received via the up-link fixed and scanning spot beams to the appropriate down-link fixed and scanning spot beams. Additionally, a transmission and a switching format is disclosed for the efficient multiple access of the low traffic demand ground station areas while still providing minimal buffering demands for the high traffic demand ground station areas.

10 Claims, 4 Drawing Figures

SATELLITE COMMUNICATION SYSTEM WHICH CONCURRENTLY TRANSMITS A SCANNING SPOT BEAM AND A PLURALITY OF FIXED SPOT BEAMS

BACKGROUND OF THE INVENTION

1. Field of the Invention

The present invention relates to a satellite repeater for use with a satellite communication system and, more particularly, to a satellite repeater capable of concurrently transmitting (a) a plurality of fixed spot beams for communicating, for example, with a similar plurality of spaced-apart high traffic ground station areas, and (b) a scanning spot beam for sequentially communicating, for example, with a plurality of spaced-apart low traffic ground station areas on a time-division multiple access (TDMA) basis.

2. Description of the Prior Art

The current approaches to domestic-satellite systems divided along the lines of area-coverage and spot-beam concepts. Each system has its merits as well as disadvantages. A spot-beam satellite system allows high antenna gain and several reuses of the allocated frequency spectrum. In this regard see, for instance, U.S. Pat. No. 3,406,401 issued to L. C. Tillotson on Oct. 15, 1968. The disadvantage of such a system stems from the fact that each spot-beam covers only a small area. To avoid cochannel interference, a dead space between any two adjacent beams much larger than the beam coverage area (e.g., 3-dB contour) is required where the same frequency spectrum and polarization is used in adjacent beams. Also, there are regions needing service which do not have enough traffic to justify a dedicated spot-beam.

Area coverage satellites, such as used, for example, by AT&T/GTE, use broad antenna beams covering, for example, the whole United States. They are capable of providing service everywhere within the continental U.S.A. but lack channel capacity because the alloted spectrum can be reused at most once by polarization reuse. A more significant disadvantage, however, is the power penalty associated with the gain of an area-coverage antenna. The 3-dB contour gain of a U.S. coverage antenna is approximately 27-dB, and there appears little that can be done to improve it further. To obtain the same SNR as the previously mentioned spot-beam antenna system, the required RF power to transmit, for example, at a 600-Mb/s data rate would be 3 kW. Equivalently, one could use a 10 times larger diameter earth station antenna than used by a spot-beam system. Since neither alternative is practical, the link signal-to-noise ratio (SNR) must be compromised by approximately 10-dB. Even with a 10-dB sacrifice in margin, an additional 10-dB must be obtained through a combination of higher satellite transmitter power and larger earth station antennas.

Arrangements for using a movable beam in satellite, airborne, or mobile communication systems have also been disclosed. For example, U.S. Pat. No. 3,750,175 issued to R. M. Lockerd et al on July 31, 1973 discloses a modular electronics communication system comprising a plurality of radiating elements formed into an antenna array for transmitting and receiving communication frequency signals and employing a central processor to generate the transmitted signals and process the received frequencies through a manifold arrangement. Each radiating element connects to the manifold through a module made up of integrated microwave circuitry including a mixer coupled to a local oscillator and a phase shifter coupled to a beam steering computer. By means of the beam steering computer the antenna can be made to scan various preselected areas to primarily overcome tolerances in the satellite's or aircraft's attitude control system and maintain a beam at a desired target area. Additionally, the possible use of steerable beams and time-hopped steerable beams was suggested, but no implementation thereof shown, in *Progress in Astronautics and Aeronautics,* Vol. 33, pp. 503–531 at page 507 in the article "Characteristics and Applications of Multibeam Spacecraft Antennas", which was presented as Paper 72-530 at the AIAA 4th Communications Satellite Systems Conference, Washington, D.C., April 24–26, 1972.

In the more recently proposed Intelstat V satellite communication system, it has been proposed to concurrently use an overlapping fixed spot beam, a larger area zone coverage beam, and a still larger hemisphere coverage beam, each type of beam using a different frequency spectrum and/or polarization for transmitting its signals to avoid interference at receivers capable of receiving signals in more than one type of beam, for increasing satellite throughput capacity. Additionally, the concurrent use of both a plurality of fixed spot beams and an area coverage beam, which overlaps the spot beams and where all beams use the same frequency spectrum for transmission, has been proposed in the article "Spectral Reuse in 12 GHz Satellite Communication Systems" by D. O. Reudink et al in IEEE Conference Record ICC 77, June 12–15, 1977, Chicago, Ill., Vol. 3, at pp. 37.5-32 to 37.5-35. There, arrangements are disclosed for substantially cancelling the interference of the received signals originally transmitted in the area coverage beam with the desired spot beam signals received in each of the overlapped spot beam receiver areas.

The problem remaining in the prior art is to provide a satellite communication system which achieves an increase in capacity in a particular frequency spectrum over prior art multiple-beam communication systems while both avoiding interference between signals in beams used for both low traffic and high traffic ground station areas and reducing the power requirements by increasing the gain in transmissions to low traffic ground stations.

BRIEF SUMMARY OF THE INVENTION

The problem remaining in the prior art has been solved in accordance with the present invention which relates to a satellite repeater for use with a satellite communication system and, more particularly, to a satellite repeater capable of concurrently transmitting (a) a plurality of fixed spot beams for communicating, for example, with a similar plurality of spaced-apart high traffic ground station areas, and (b) a scanning spot beam for sequentially communicating, for example, with a plurality of spaced-apart low traffic ground station areas.

It is an aspect of the present invention to provide a switching frame format which permits the interconnection of a plurality of high traffic demand ground station areas and a plurality of low traffic demand ground station areas via a plurality of fixed spot beams and a scanning spot beam, respectively, which are concurrently transmitting information between the various ground station areas.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

A scanning beam satellite system can provide complete coverage of a selected area, as, for example, the entire United States, on a time-division multiple access (TDMA) basis. In accordance with the present invention, the scanning beam's instantaneous antenna pattern is concentrated to a small area of the entire area to be covered. This results in, inter alia, a realization of savings in RF power to permit the simultaneous use of a scanning beam and a number of fixed spot beams. In this manner the scanning beam can be used to serve many spaced-apart low traffic ground station areas while each of the fixed spot beams can be used to serve a separate high traffic ground station area such as a metropolitan area located within the entire area to be served by the satellite system. In this manner, a satellite system is provided having increased capacity over the presently used area beam or spot beam system or the proposed scanning beam systems. Additionally, the present communication system permits the fixed and scanning spot beams, under normal operating conditions, to transmit signals within the same frequency spectrum with virtually no interference therebetween since the beams do not overlap each other at the associated ground station areas as found in the proposed combined area coverage and fixed spot beam systems which require interference rejection techniques to be used when employing the same frequency spectrum for all signals. However, to assure substantially no interference, it is preferred that the scanning spot beams and the fixed spot beams utilize different polarizations. Additionally, the use of different polarizations is preferable since occasions can occur when the scanning beam may be required to be directed either wholly or partially into a fixed beam ground station area to overcome, for example, an overload condition existing in a particular fixed beam ground station area or a malfunction at the satellite of a particular fixed beam transmitter or receiver.

Figure 1:
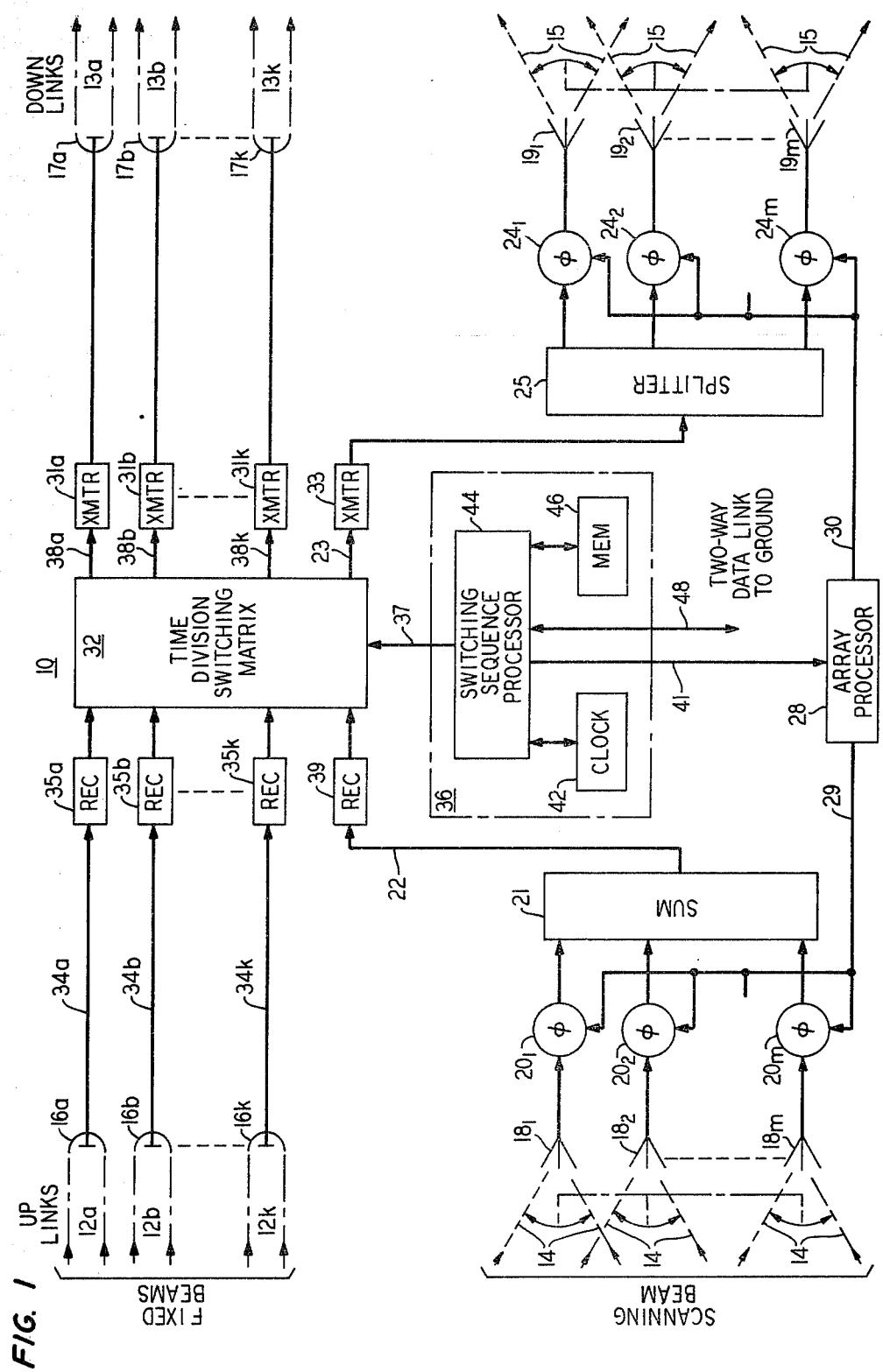
FIG. 1 is a block diagram of a satellite repeater time-division interconnection arrangement for interconnecting a plurality of fixed up-link and down-link spot beams and an up-link and down-link scanning spot beam in accordance with the present invention.

Turning now to the drawings, FIG. 1 illustrates the basic satellite switching repeater 10 configuration for concurrently transmitting and receiving a plurality of fixed spot beams and one scanning spot beam. For illustrative purposes only, 11 up-link and 11 down-link fixed spot beams designated $12a-12k$ and $13a-13k$, respectively, and a scanning up-link and down-link spot beam designated 14 and 15, respectively, are shown. Each of the associated up-link and down-link fixed spot beams $12a, 13a; 12b, 13b; \ldots; 12k, 13k$ are received from and transmitted to a separate fixed geographical ground area (not shown) within the viewing area of satellite switching repeater 10. The up-link and down-link scanning spot beams 14 and 15 are scanned independently among a plurality of spaced-apart geographical ground areas (not shown) which do not form a part of the geographical ground areas associated with the various fixed spot beams 12 and 13. For illustrative purposes only, the plurality of corresponding spaced-apart geographical ground areas associated with scanning spot beams 14 and 15 will be considered to include one hundred separate areas. it is also to be understood that each of the 11 fixed spot beam and 100 scanning spot beam geographical ground areas can include one or more ground stations desiring to communicate with any of the other ground stations in the same or other geographical ground areas.

Each of the up-link fixed spot beams $12a-12k$ are shown being intercepted or received at antennas $16a-16k$, respectively, while each of the down-link fixed spot beams $13a-13k$, are launched by antennas $17a-17k$, respectively. It is to be understood that antennas $16a-16k$ and $17a-17k$ can comprise any suitable antenna means capable of receiving or transmitting each of fixed spot beams $12a-12k$ and $13a-13k$ as, for example, a signal reflector having the requisite aperture to cover all of the associated fixed spot beam geographical ground areas and a separate feedhorn for each fixed spot beam disposed on the focal plane of the reflector at a point where the associated fixed spot beam is focused by the reflector.

The up-link and down-link scanning spot beams 14 and 15 are respectively received and transmitted by any suitable antenna means which will permit the individual beams to be scanned over all of the 100 exemplary scanning spot beam geographical ground areas. Such antenna means can take the form of, for example, a phased antenna array as shown in FIG. 1 where the up-link receiving array and down-link transmitting array are each shown as comprising a plurality of m elements $18_1—18_m$ and $19_1—19_m$, respectively. The receiving antenna elements $18_1—18_m$ are connected to phase shifters $20_1—20_m$, respectively, which, in turn, are connected to a summing circuit 21 for combining the output signals from phase shifter circuits $20_1—20_m$ into a single combined output signal on lead 22. Similarly, the input terminal of the down-link transmitting antenna elements $19_1—19_m$ are connected to the output terminals of phase shifters $24_1—24_m$, respectively, with the input terminal of phase shifters $24_1—24_m$ being connected to the output terminals of a splitting circuit 25. Splitting circuit 25 receives the instantaneous signal to be transmitted via scanning spot beam 15 on lead 26 and divides the signal equally for distribution to phase shifters $24_1—24_m$ which alters the phase of the associated input signal in a manner to cause elements $19_1—19_m$ to transmit scanning spot beam 15 in the desired direction as is well known in the art. It is to be understood that the corresponding elements of the receiving and transmitting array such as elements $18_1, 19_1; 18_2, 19_2; \ldots; 18_m, 19_m$ can comprise the same element but that under such condition separate paths for the transmitting and receiving signals between each element and its associated transmitting and receiving phase shifter may be required and can be achieved by any suitable technique as, for example, the use of known circulators in conjunction with a frequency difference between signals. Additionally, each of phase shifters $20_1$–$20_m$ and $24_1$–$24_m$, summing circuit 21, and splitting circuit 25 can comprise any suitable circuit which is commercially available.

In the operation of each of scanning spot beams 14 and 15, an array processor 28 transmits a sequence of control signals over a bus 29 to each of the up-link phase shifters $20_1$–$20_m$ using any suitable technique well known in the art to cause the array to scan spot beam 14 over the associated scanning spot beam geographical ground areas in synchronization with the expected reception of signals from such ground areas. Concurrent therewith, the array processor 28 similarly transmits a separate sequence of control signals over a bus 30 to each of the down-link phase shifters $24_1$–$24_m$ to cause the array to scan spot beam 15 over the associated scanning spot beam geographical ground areas in synchronization with the expected transmission of signals to such areas as will be more clearly defined in conjunction with the discussion hereinafter relating to FIG. 3.

In accordance with the present invention, up-link signals concurrently received via fixed spot beams 12a–12k and scanning spot beam 14 form separate input signals on leads 34a–34k and 22, respectively, to respective receivers 35a–35k and 39 and, in turn, to a time-division switching matrix 32. These input signals are concurrently and selectively switched by the space and time-division switching matrix 32, in response to control signals on bus 37 from a clock and switching sequencer 36, to the appropriate output lead 38a–38k and 23 for transmission via transmitters 31a–31k and 33 and, in turn, down-link fixed spot beams 13a–13k and scanning spot beam 15, respectively.

Figure 2:
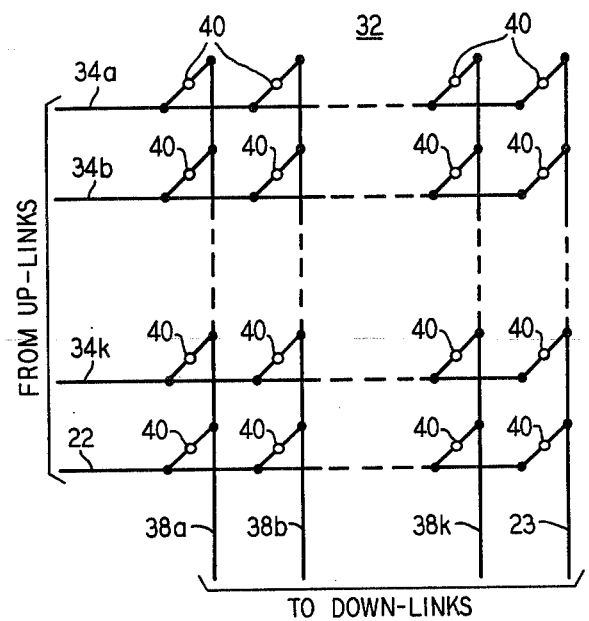
FIG. 2 is a schematic diagram of a typical satellite time-division switching matrix for use in the present satellite repeater of FIG. 1.

Time-division switching matrix 32 can comprise any suitable switching matrix which can provide high-speed switching with relatively low power requirements. Exemplary switches which have the desired characteristics are, for example, the well known microwave switches which include, inter alia, the semiconductor diode (pin) switch and the magnetic latching switch. A preferred arrangement for switching matrix 32 is shown in FIG. 2 and is typical of known arrangements. For the exemplary conditions of 11 fixed up-link and down-link spot beams serving 11 spaced-apart high traffic geographical ground areas and one up-link and down-link scanning spot beam serving 100 spaced-apart low traffic geographical ground areas, the switching matrix 32 comprises a 12×12 array of microwave switches 40 and their associated drivers (not shown). Each of the instantaneous up-link signals on input leads 34a–34k and 22 are concurrently cross connected via a separate one of switches 40 to the desired one of output leads 38a–38k and 23 in response to control signals on bus 37 from clock and switching sequencer 36. The dynamic switching of the satellite switching matrix 32 is divided into a sequence of time intervals which are combined into a frame interval as shown in FIG. 3.

Clock and switching sequencer 36 comprises a clock circuit 42, a switching sequencer processor 44 and a memory section 46. The clock circuit 42 is synchronized with all the system clocks at the remote ground areas via telemetry signals on a two-way data link 48 from one or more ground stations to permit effective reception and transmission of signals through satellite repeater 10 via switching matrix 32. The clock pulses from circuit 36 are also transmitted over lead 41 for use by array processor 28 for coordinating the control signals transmitted over buses 29 and 30 to phase shifters $20_1$–$20_m$ and $24_1$–$24_m$, respectively, to direct scanning spot beams 14 and 15 at the appropriate ground area in synchronization with (a) the expected arrival and transmission of signals related to each ground area and (b) the simultaneous switching of the received signals to the appropriate down-link beams by switching matrix 32. Synchronization of the system clocks can be achieved using any suitable technique known in the art which, for example, can take the form of synchronization pulses which are transmitted via round trip telemetry signals through the satellite repeater 10 to the various ground stations. The switching sequencer processor 44 of circuit 36 generates the necessary control signals to interconnect the appropriate input and output leads through switches 40 of matrix 32 during each frame interval in response to the synchronized clock signals from clock 42 and the desired interconnection sequence stored in the associated memory section 46. Any suitable high speed switching sequencer and memory means which is available can be used to generate the desired control signals.

In accordance with the present invention, it is to be understood that many ground stations may be disposed within each of the receiving areas of down-link fixed spot beams 13a–13k, and scanning spot beam 15 and that these ground stations will have diverse circuit requirements ranging from a few circuits for a small station to hundreds of circuits for a major station. An additional difficulty is that although the ground stations serviced by each of fixed spot beams 13a–13k are covered by that particular beam all of the time, the ground stations serviced by scanning spot beams 14 and 15 can only be intermittently covered. Therefore, each scanning spot beam is individually steered so that various spaced-apart geographical ground areas within the scanning range of the phased array antenna $18_1$–$18_m$ and $19_1$–$19_m$ can be covered and a TDMA configuration is perfectly suited therefor. To achieve total service, it becomes necessary to scan both the transmit and receive scanning spot beams 14 and 15, respectively, while coordinating their movements with array processor 28 in accordance with the pair-wise traffic demands of the system.

Figure 3:
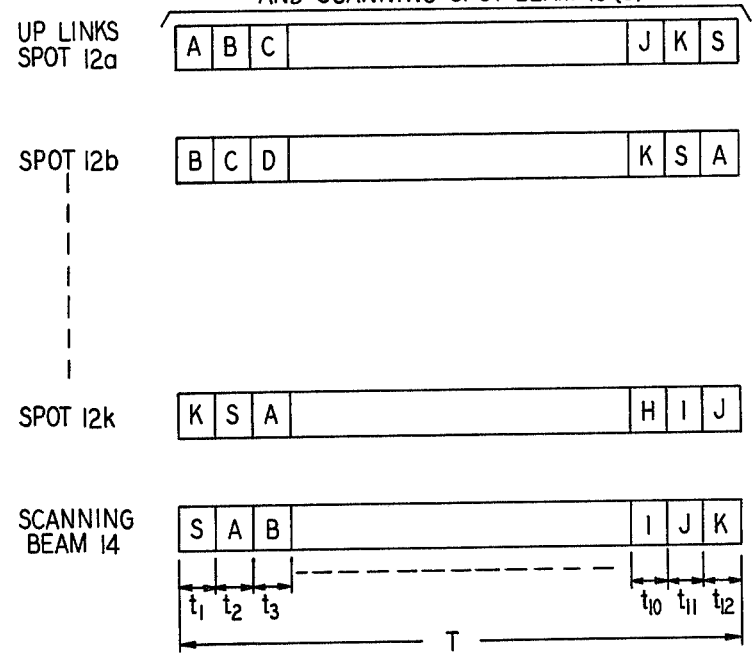
FIG. 3 illustrates an exemplary switching frame sequence format for concurrently interconnecting 11 up-link fixed spot beams and one up-link scanning spot beam with 11 down-link fixed spot beams and one down-link scanning spot beam.

An architecture which allows efficient multiple access by the low traffic demand ground stations while still providing minimal buffer demands for the high traffic demand ground stations is shown in FIG. 3. For purposes of illustration, it will be assumed that there is equal traffic among beams. Under such condition the satellite time-division switching matrix 32 follows a cyclic pattern and establishes connections among the various beams on a subframe basis per each switching frame, where in FIG. 3, for exemplary purposes, the frame is designated T and each of the sequential subframes therein has a separate designation in the sequence $t_1$–$t_n$, where n represents the total number of down-link beams and equals 12 for the exemplary system having 11 fixed up-link and down-link spot beams and one up-link and down-link scanning spot beam. In FIG. 3, up-link fixed spot beam 12a is shown sequentially connected by switching matrix 32 to down-link beams A(13a), B(13b), ..., K(13k), and S(15) once during each switching frame period T. Concurrent therewith, up-link fixed spot beam 12b is sequentially connected by switching matrix 32 to down-link beam B(13b), C(13c), ..., S(15), and A(13a) while up-link scanning spot beam 14 is sequentially connected to down-link beams S(15), A(13a), ..., J(13j) and K(13k) during switching frame period T. Similarly all other up-link fixed spot beams 12k-13k are concurrently connected to the various down-link fixed spot beams 13a-13k and scanning spot beam 15 in a sequence which assures that no two up-link beams are connected at any instant of time to the same down-link beam. It is to be understood that the sequences shown in FIG. 3 for the switching of signals between up-link beams 12a-12k and 14 and down-link beams 13a-13k and 15 are merely illustrative of a typical set of sequences and that any other set of sequences which do not at any instant of time connect two up-link beam signals to the same down-link beam can be substituted.

To implement a TDMA switching arrangement for the combination of a plurality of up-link and down-link fixed spot beams and an up-link and a down-link scanning spot beam presents various problems which must be overcome for an operable system. For example, a minimum burst length for communication between any two ground stations must be chosen to achieve efficient access and then a subframe and a frame length determined to meet the various traffic demands where each fixed and scanning spot beam ground area can comprise one or more separate ground stations desiring access to satellite repeater 10.

For purposes of illustration and not for purposes of limitation, the arrangement of FIG. 1 will hereinafter be assumed to operate with voice circuits at a 32 kb/sec. rate, a minimum burst length of 400 bauds with, for example, a preamble of 67 bauds, and a frame T duration of 250 μsec. With such conditions prescribed, a minimum burst length of 467 bauds would have a duration of 1.557 μsec. at a bit rate of 600 mb/sec., and provide transmission for 100 voice circuits at the 32 kb/sec. rate. The preamble for each burst generally provides the necessary information for, inter alia, carrier and timing recovery, frame synchronization, ground station identification, etc. In view of the format of FIG. 3 and the abovementioned assumptions, each of the 12 subframes $t_1$—$t_{12}$ of frame T has a capacity of 6250 bauds of information which can include slightly more than 13 minimum bursts of 467 bauds. This remainder above the 13 minimum bursts per subframe is used, for example, with the scanning beams 14 and 15 as overhead which is a function of the beam switching speed.

Therefore, during each subframe, t, of the format of FIG. 3, each of the exemplary 11 up-link fixed spot beams 12a-12k and the up-link scanning spot beam 14 can access no more than 13 ground stations within a fixed spot beam receiving ground area or 13 scanning spot beam ground stations. Since it was assumed that, in the exemplary system, scanning spot beams 14 and 15 were to be associated with 100 spaced-apart low traffic ground areas each having one or more ground stations associated therewith, the format of FIG. 3 must be expanded upon to permit each of the ground stations associated with up-link fixed and scanning spot beams 12a-12k and 14 to communicate with all of the other ground stations via down-link fixed and scanning spot beams 13a-13k and 15. To accomplish this, the switching format of FIG. 4 is used which applies a sequence of 100 frames, T, designated 1-100 to make up a super frame.

Figure 4:
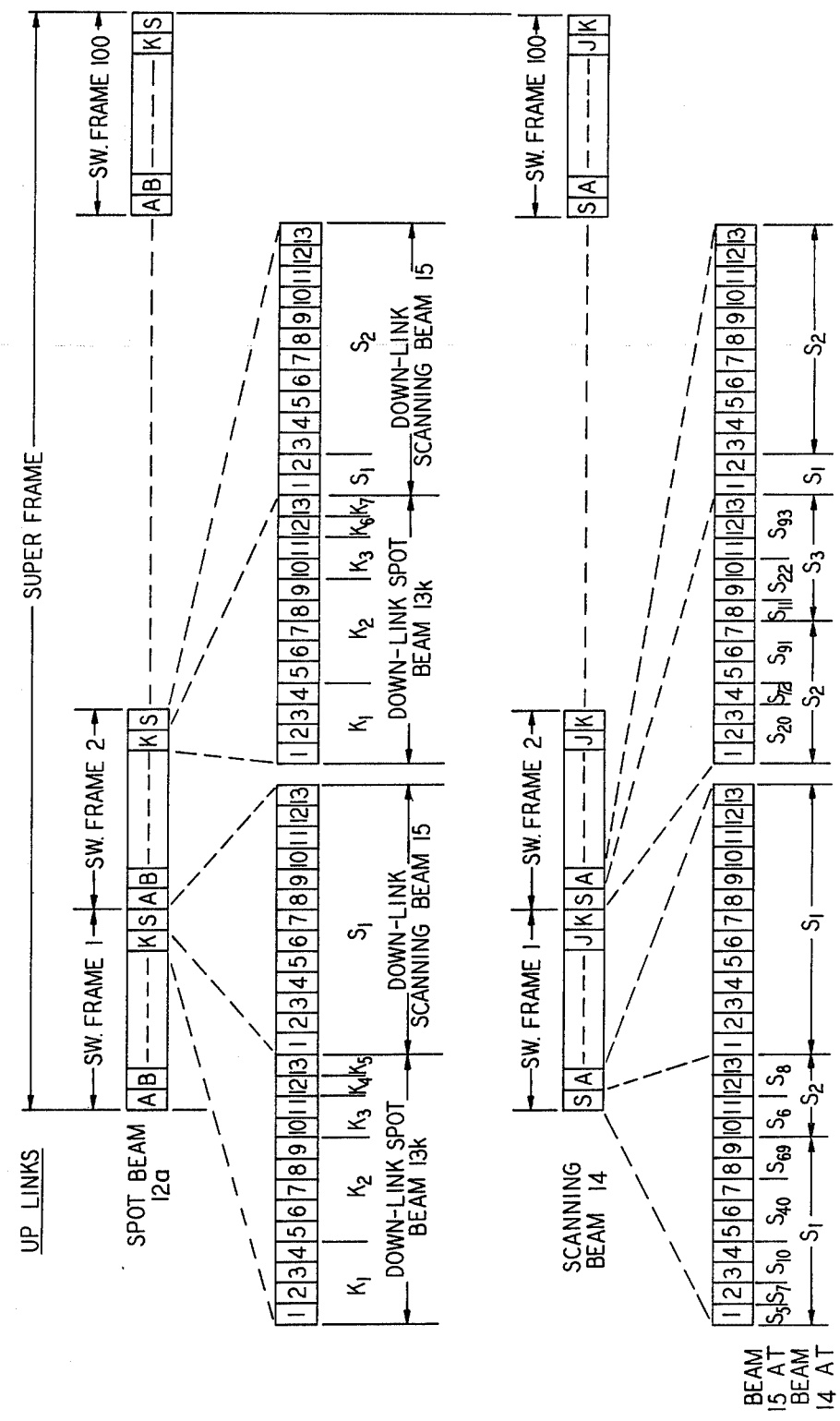
FIG. 4 illustrates exemplary burst assignments for transmission of signals between the various ground areas and stations therein for the format of FIG. 3.

In the structure of FIG. 4, the sequence shown in FIG. 3 is repeated for each of the up-link fixed spot beams 12a-12k and up-link scanning spot beam 14 in each of the associated 100 frames 1-100. The varying traffic demands between the various pairs of ground stations of the system is substantially met by the proper scheduling of an appropriate number of minimum bursts within a subframe designated for communication between the ground areas wherein the two stations are situated. For purposes of illustration only, an exemplary sequence will be shown for the allocation of signalling time between ground stations using fixed up-link spot beam 12a and, for example, the ground stations in both fixed spot beam area K, served by fixed down-link spot beam 13k, and scanning spot beam areas $S_1$-$S_{100}$, served by scanning down-link spot beam 15. It is to be understood that many other sequences can be used to fulfill the traffic demands of the various pairs of ground stations and still fall within the spirit and scope of the present invention.

For purposes of illustration, it will be assumed that the ground area served by up-link and down-link fixed spot beams 12a and 13a, respectively, has four ground stations ($A_1$-$A_4$) and that the ground area served by up-link and down-link fixed spot beams 12k and 13k, respectively, has seven ground stations ($K_{1-7}$). It will be further assumed that the traffic demands for communication from ground stations $A_1$-$A_4$ to each of the ground stations $K_1$-$K_7$ require the following number of voice circuits: $K_1$=400 voice circuits (V.C.); $K_2$=500 V.C.; $K_3$=200 V.C.; and $K_4$-$K_7$ each require 50 V.C. It is to be understood that with the system conditions previously assumed, only a maximum of 1300 voice circuits are available between any two fixed beam ground areas since there are only 1300 minimum bursts available in a super frame between such ground stations. More particularly, to provide 100 voice circuits between two particular ground areas it is necessary to assign 100 minimum bursts per super frame for such communication. This can be preferably accomplished by assigning one corresponding burst in each frame of the super frame or alternatively, for example, to assigning two minimum bursts in alternate frames of the super frame to such intercommunication link.

In FIG. 4, each of the subframes K in switching frames 1 and 2 which interconnect the signals in up-link fixed spot beam 12a to down-link fixed spot beam 13k have been expanded to show the 13 possible sequential minimum bursts therein and how such bursts can typically be assigned to meet the traffic demands specified hereinabove. For example, the 400, 500 and 200 V.C. requirements for communication with ground stations $K_1$, $K_2$ and $K_3$, respectively, have been met by assigning these ground stations respectively to minimum bursts 1-4, 5-9 and 10-11 in each of switch frames 1-100. Since each of ground stations $K_4$-$K_7$ only require 50 V.C., these traffic demands are met by, for example, assigning minimum bursts 12 and 13 of the odd numbered frames to ground stations $K_4$ and $K_5$, respectively, and the bursts 12 and 13 of the even numbered frames to ground stations $K_6$ and $K_7$, respectively. Therefore, any ground station having less than a 100 V.C. requirement uses buffering means to store its signal until the assigned burst, at which time the stored signals will be transmitted. For example, a ground station having a 25 V.C. requirement might transmit its signals during a single minimum burst once every 4th frame or a 10 V.C. requirement might use a single minimum burst once every 10th frame. It is to be understood that a minimum burst of 467 bauds may contain less than 400 bauds of information where desired, but that such transmission would reduce the transmission efficiency.

At the transmitting end in the area associated with up-link fixed spot beam 12a, ground stations $A_1$-$A_4$ will be similarly scheduled to each appropriately interleave their respective transmissions destined for ground stations $K_1$-$K_7$ in accordance with both their individual traffic demands and the subframe sequence hereinbefore outlined in FIG. 4. For example, if the traffic demands between each of ground stations $A_1$-$A_4$ and ground stations $K_1$ is 100 V.C., then during each of frames 1-100 minimum bursts 1-4 can be assigned to ground stations $A_1$-$A_4$, respectively. Where the traffic demands between ground stations $A_1$-$A_4$ and ground station $K_1$ are, for example, $A_1 = 200$ V.C., $A_2 = 100$ V.C., and $A_3$ and $A_4$ each require 50 V.C. Then minimum bursts 1 and 2 can be assigned to ground station $A_1$ in each frame, burst 3 to ground station $A_2$ in each frame and burst 4 alternatively shared by ground station $A_3$ and $A_4$ where station $A_3$ might be assigned burst 4 in the odd numbered frames while station $A_4$ is assigned burst 4 in the even numbered frames. A similar technique is used with each of the other ground station areas and the other fixed up-link spot beams 12b-12k.

With reference to the interconnection of up-link signals in fixed spot beam 12a to down-link scanning spot beam 15 during subframe S of each frame in the super frame, a similar technique is used as outlined hereinbefore for the communication of ground stations $A_1$-$A_4$ with ground stations $K_1$-$K_7$. Since there are 100 exemplary scanning beam ground areas each of which has one or more ground stations therein, it becomes impossible to access them all during one frame when only 13 minimum bursts are available during an associated subframe. Therefore, since the scanning beam ground station areas and the associated ground stations therein are of a low traffic type, assignment of the minimum bursts over the 100 subframes in a super frame is again accomplished in accordance with the individual traffic demands existing between the various high and low traffic ground station areas. For example, if the traffic demands between ground stations $A_1$-$A_4$ and scanning beam ground areas $S_1$ and $S_2$ are 15 and 11 voice circuits, respectively, then such traffic demands can be met by respectively assigning bursts 1-13 of subframe S in switch frame 1 and bursts 1-2 of subframe S in switch frame 2 to ground area $S_1$ and bursts 3-13 of subframe S in switch frame 2 to ground area $S_2$ as shown in FIG. 4. By combining adjacent bursts within a single subframe or corresponding adjacent subframes to such traffic demands instead of spreading them via single bursts over more frames results in a reduction in the amount of movement of scanning beam 15. Therefore, during each subframe S for fixed spot beams 12a-12k and scanning spot beam 14 the down-link scanning beam is moved over from one to 13 scanning beam ground areas in accordance with a schedule determined from the various traffic requirements. It is to be understood that such schedule for all beams is repeated every super frame.

While the down-link scanning spot beam 15 is moving between a maximum of 156 scanning beam ground areas (12 subframes × 13 minimum bursts) during each frame for all of the up-link beams, up-link scanning beam 14 is preferably moved in the following manner and as shown in FIG. 4. With reference to the period of each frame devoted to the transmission of signals via each of down-link fixed spot beam 12a-12k which originated at one or more scanning beam ground areas, up-link scanning beam 14 is directed at the particular one or more of the 100 scanning beam ground areas during each frame of the super frame in a manner preferably to complete the two-way transmissions found in the up-link sequence between each of the fixed spot beams 12a-12k and each of the scanning beam ground areas. More particularly, during each portion of frames 1-100 of the super frame assigned for down-link transmissions via fixed spot beams 13a-13k, scanning beam 14 is sequentially directed at particular ones of the scanning beam ground areas 1-100 in accordance with the sequence which reciprocally corresponds to the sequence used for subframe S in each frame associated with up-link fixed spot beams 12a-12k. For example, as shown in FIG. 4, during subframe A of switching frame 1, scanning spot beam 14 is directed at scanning beam ground area $S_1$ during bursts 1-13 for the transmission of 13 voice circuits from ground area $S_1$ to fixed spot beam area A served by down-link fixed spot beam 13a, since during subframe S of switching frame 1, 13 voice circuits were received from ground area A via up-link fixed spot beam 12a and destined for scanning beam ground area $S_1$ via down-link scanning spot beam 15. Similarly, during subframe A of switching frame 2, scanning spot beam 14 is directed at scanning beam ground area $S_1$ during bursts 1-2 and then at scanning beam ground area $S_2$ during bursts 3-13 to provide the return voice paths for the 13 voice circuits shown in subframe S of switching frame 2 associated with up-link fixed spot beam 12a.

During subframe S of each of frames 1-100, however, scanning beam 14 is moved in the following manner to both achieve maximum coverage of the scanning beam ground areas $S_1$-$S_{100}$ and substantially meet the traffic requirements between the various pairs of the ground areas $S_1$-$S_{100}$. In accordance with the previously assumed system conditions, only 1300 voice circuits (V.C.) are available per super frame for use for communication between all the pairs of scanning beam ground stations $S_1$-$S_{100}$. For purposes of illustration, it will be assumed that the traffic demands between (a) scanning beam ground area $S_1$, and scanning beam ground areas $S_5$, $S_7$, $S_{10}$, $S_{40}$ and $S_{69}$ are 1, 1, 2, 3, and 2 V.C., respectively; (b) scanning beam ground area $S_2$ and scanning beam ground areas $S_6$, $S_8$, $S_{20}$, $S_{72}$ and $S_{91}$ and 2, 2, 3, 1, 3 V.C., respectively, and (c) scanning beam ground area $S_3$ and scanning beam ground areas $S_{11}$, $S_{22}$ and $S_{93}$ are 1, 2 and 3 V.C., respectively. The above-mentioned traffic demands can be met by typically scheduling the minimum bursts 1-13 in subframe S of switch frame 1 and 2 associated with scanning beam 14 as shown in FIG. 4. The other subframes S of switch frames 3-100 can be similarly assigned to cover the other traffic demands between any two scanning beam ground areas to the extent of 1300 voice circuits. By assigning voice circuit requirements to adjacent minimum bursts rather than to individual bursts spread over a number of frames, minimum movement of both scanning beams 14 and 15 is achieved.

It is to be understood that the above-described embodiments are simply illustrative of the principles of the invention. Various other modifications and changes may be made by those skilled in the art which will embody the principles of the invention and fall within the spirit and scope thereof.

We claim:
1. An antenna means for a satellite repeater comprising in combination
   a first antenna section (16a–16k, 17a–17k) capable of concurrently receiving and transmitting a plurality of k paired first type directional up-link and down-link spot beams of radiated energy (12a–13a; ... ; 12k–13k) containing signals within a predetermined frequency spectrum, where each pair of up-link and down-link directional spot beams is associated with a separate one of a plurality of k spaced-apart first type remote ground station areas; and
   a second antenna section capable of concurrently receiving and transmitting a separate second type up-link and down-link beam (14, 15) of radiated energy, respectively, containing signals within the predetermined frequency spectrum for providing communication with plurality of x spaced-apart second type remote ground station areas;
   characterized in that
   the second antenna section comprises a first portion ($18_1$–$18_m$) which is capable of being directionally changeable to scan over the plurality of x second type spaced-apart remote ground station areas in a first predetermined scanning format and in synchronism with the expected arrival of up-link signals from each of the second type spaced-apart remote ground station areas on a time-division multiple access basis, and a second portion ($19_1$–$19_m$) which is capable of being directionally changeable to scan over the plurality of x second type spaced-apart remote ground station areas in a second predetermined scanning format and in synchronism with the transmission of signals destined for each of the second type spaced-apart remote ground station areas.

2. An antenna means according to claim 1 characterized in that
   the first and second portion of the second antenna section each comprise a phased antenna array of a plurality of elements.

3. A satellite repeater for use in a satellite communication system comprising in combination
   antenna means comprising a first antenna section (16a–16k, 17a–17k) capable of concurrently receiving and transmitting a plurality of k paired first type directional up-link and down-link spot beams of radiated energy (12a–13a; ... ; 12k–13k) containing signals within a predetermined frequency spectrum, where each pair of up-link and down-link directional spot beams is associated with a separate one of a plurality of k spaced-apart first type remote ground station areas, and a second antenna section capable of concurrently receiving and transmitting a separate second type up-link and down-link beam (14, 15) of radiated energy, respectively, containing signals within the predetermined frequency spectrum for providing communication with a plurality of x spaced-apart second type remote ground station areas; and
   a time-division switching matrix (32) capable of concurrently switching the signals received via the first and second type up-link beams by the first and second antenna sections, respectively, to the appropriate first and second type down-link beams for transmission via the first and second antenna sections, respectively, in accordance with a predetermined switching format,
   characterized in that
   the second antenna section comprises a first portion ($18_1$–$18_m$) which is capable of being directionally changeable to scan over the plurality of x second type spaced-apart remote ground station areas in a first predetermined scanning format and in synchronism with the expected arrival of up-link signals from each of the second type spaced-apart remote ground station areas on a time-division multiple access basis, and a second portion ($19_1$–$19_m$) which is capable of being directionally changeable to scan over the plurality of x second type spaced-apart remote ground station areas in a second predetermined scanning format and in synchronism with the transmission of signals destined for each of the second type spaced-apart remote ground station areas.

4. A satellite repeater according to claim 3 characterized in that
   the first and second portion of the second antenna section each comprise a phased antenna array of a plurality of elements, and
   the satellite repeater further comprises an array processor (28) capable of sending control signals to each element of the phased antenna array of the first and second portion for controlling the directionality of each portion in accordance with the first and second predetermined scanning formats, respectively, and with the associated respective reception and transmission of signals from and to the appropriate ones of the plurality of x second type spaced-apart remote ground station areas.

5. A satellite repeater according to claim 3 characterized in that
   the satellite repeater further comprises a processing means (28, 36) capable of concurrently providing control signals to both (a) the second antenna section for separately directing each of the first annd second portion thereof to scan the second type spaced-apart remote ground station areas in accordance with the first and second predetermined scanning formats, respectively, and (b) the time-division switching matrix for switching the signals propagating in the various first and second type up-link beams to the various first and second type down-link beams in accordance with the predetermined switching format.

6. A satellite repeater according to claim 3 or 5 characterized in that
   the time-division switching matrix (32) comprises a plurality of at least $(k+1)^2$ switching points which are capable of being activated in accordance with the predetermined switching format to concurrently and selectively cause the signals in each of the first and second type up-link beams received by the first and second antenna sections, respectively, to be concurrently retransmitted both in a separate one of the first and second type down-link beams during a first predetermined interval of time (t), and then in another one of the first and second type down-link beams during each subsequent first predetermined interval of time (t) forming a second predetermined interval of time T before the sequence is repeated during each second predetermined interval of time (T), each second predetermined interval of time (T) comprising p first predetermined intervals of time (t) where p equals the number of first and second type down-link beams.

7. A satellite repeater according to claim 6 characterized in that
   each of the first predetermined intervals of time (t) comprises a plurality of q burst periods where each burst period comprises r bits of information representative of a separate one-way transmission channel for assignment between a particular ground station in each of the ground station areas interconnected by the time-division switching matrix.

8. A method of concurrently providing two-way communications between various combinations of a plurality of k first type ground station areas and a plurality of x second type ground station areas via a satellite repeater, the method comprises the steps of:
   at the satellite repeater
   (a) concurrently receiving separate continuous up-link signals from each of the plurality of k first type spaced-apart ground station areas via an up-link portion of a first antenna section and an up-link signal from the plurality of x second type spaced-apart ground station areas via an up-link portion of a second antenna section which provide access on a time-division multiple access basis, each of the concurrently received up-link signals having a destination for a separate one of the plurality of k first type spaced-apart ground station areas and one of the plurality of x second type spaced-apart ground station areas at any instant of time; and
   (b) concurrent with step (a), concurrently transmitting at any instant of time each of the received up-link signals (a) via a down-link portion of the first antenna section to the appropriately destined ground station areas in separate ones of a plurality of k first type down-link spot beams and (b) via a down-link portion of the second antenna section to the appropriately destined ground station area in the plurality of x second type spaced-apart ground station areas in a second down-link beam,
   characterized in that
   the method comprises the further steps
   (c) in performing step (a) changing the directionality of the up-link portion of the second antenna section for scanning the plurality of x second type spaced-apart ground station areas in accordance with a first predetermined scanning format and in synchronism with the expected arrival of the up-link signals from each of the second type spaced-apart ground station areas on a time-division multiple access basis; and
   (d) in performing step (b) changing the directionality of the down-link portion of the second antenna section for scanning the plurality of x second type spaced-apart ground station areas in accordance with a second predetermined scanning format and in synchronism with the transmission of signals destined for each of the second type spaced-apart ground station areas.

9. The method according to claim 8 characterized in that
   the method comprises the further steps of:
   (e) concurrently and selectively causing each of the up-link signals received in steps (a) and (c) by the up-link portions of the first and second antenna sections to be retransmitted in steps (b) and (d) in a separate one of the first and second type down-link beams during a first one of a first predetermined interval of time (t); and
   (f) during each of the next p-1 sequential first predetermined intervals of time (t), retransmitting each of the received up-link signals in another one of the first and second type down-link beam before repeating steps (e) and (f), where p equals the number of first and second type down-link beams and a second predetermined interval of time (T) is formed by combining p sequential first predetermined intervals of time (t).

10. The method according to claim 9 characterized in that
    the method comprises the further steps of:
    (g) in performing steps (e) and (f), subdividing each of the first predetermined intervals of time (t) into a plurality of q burst periods, each burst period comprising r bits of information representative of a separate one-way transmission channel for assignment between ground stations in two ground station areas interconnected during any instant of time via the satellite repeater interconnected up-link and down-link signals.

* * * * *